United States Patent
Jensen et al.

(10) Patent No.: US 11,003,151 B2
(45) Date of Patent: May 11, 2021

(54) LOOP-POWERED CONTROL OF PNEUMATIC PROCESS CONTROL DEVICES

(71) Applicant: FISHER CONTROLS INTERNATIONAL LLC, Marshalltown, IA (US)

(72) Inventors: Kurtis K. Jensen, Marshalltown, IA (US); Tom Koch, Marshalltown, IA (US); Benjamin Koch, Marshalltown, IA (US); Davin Nicholas, Bondurant, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 0 days.

(21) Appl. No.: 16/280,522

(22) Filed: Feb. 20, 2019

(65) Prior Publication Data
US 2020/0264574 A1 Aug. 20, 2020

(51) Int. Cl.
*G05B 19/042* (2006.01)

(52) U.S. Cl.
CPC .. *G05B 19/042* (2013.01); *G05B 2219/25312* (2013.01)

(58) Field of Classification Search
CPC ........ G05B 19/042; G05B 2219/25312; G05B 19/0426; G05B 19/0428; G05B 2219/2609; G08C 17/02
See application file for complete search history.

(56) References Cited

U.S. PATENT DOCUMENTS

| | | | |
|---|---|---|---|
| 3,555,252 A | 1/1971 | Garden | |
| 3,952,954 A * | 4/1976 | Taylor | B05B 3/0454 239/236 |
| 5,651,437 A * | 7/1997 | Organek | F16D 41/088 192/35 |
| 6,088,187 A | 7/2000 | Takaishi | |
| 6,370,448 B1 | 4/2002 | Eryurek | |
| 6,871,128 B2 | 3/2005 | Kouno et al. | |
| 7,021,072 B2 | 4/2006 | McMillan et al. | |
| 7,050,259 B1 | 5/2006 | Guo et al. | |
| 2004/0090892 A1 | 5/2004 | Kadlec | |

(Continued)

OTHER PUBLICATIONS

United States Patent and Trademark Office, "Non-Final Office Action," issued in connection with U.S. Appl. No. 16/280,532, dated Dec. 27, 2019, 18 pages.

*Primary Examiner* — James J Lee
*Assistant Examiner* — Shon G Foley
(74) *Attorney, Agent, or Firm* — Hanley, Flight & Zimmerman

(57) ABSTRACT

Loop-powered control of pneumatic process control devices is disclosed. A disclosed example apparatus includes an interface for use with a pneumatic process control device of a process control system. The interface includes a power input to scavenge power from a loop power control signal associated with the process control system, a sensor to determine a position of a movable control input associated with the process control device, a comparator to compare the determined position of the movable control input with a desired position of the movable control input, and an actuator to cause movement of the movable control input based on the comparison of the determined position with the desired position, where the actuator is to be powered with the scavenged power.

22 Claims, 5 Drawing Sheets

(56) References Cited

U.S. PATENT DOCUMENTS

| | | |
|---|---|---|
| 2005/0201472 A1 | 9/2005 | Loechner |
| 2006/0037467 A1 | 2/2006 | McCarroll et al. |
| 2008/0078449 A1 | 4/2008 | Pesek |
| 2009/0192653 A1* | 7/2009 | Songukrishnasamy ............... G05B 19/44 700/282 |
| 2010/0163765 A1 | 7/2010 | Gregoire |
| 2015/0226177 A1* | 8/2015 | DeFrank ............. F03G 3/04 700/284 |
| 2016/0025765 A1* | 1/2016 | Panther ............. G01P 15/00 702/150 |
| 2018/0212648 A1 | 7/2018 | Haynes et al. |

* cited by examiner

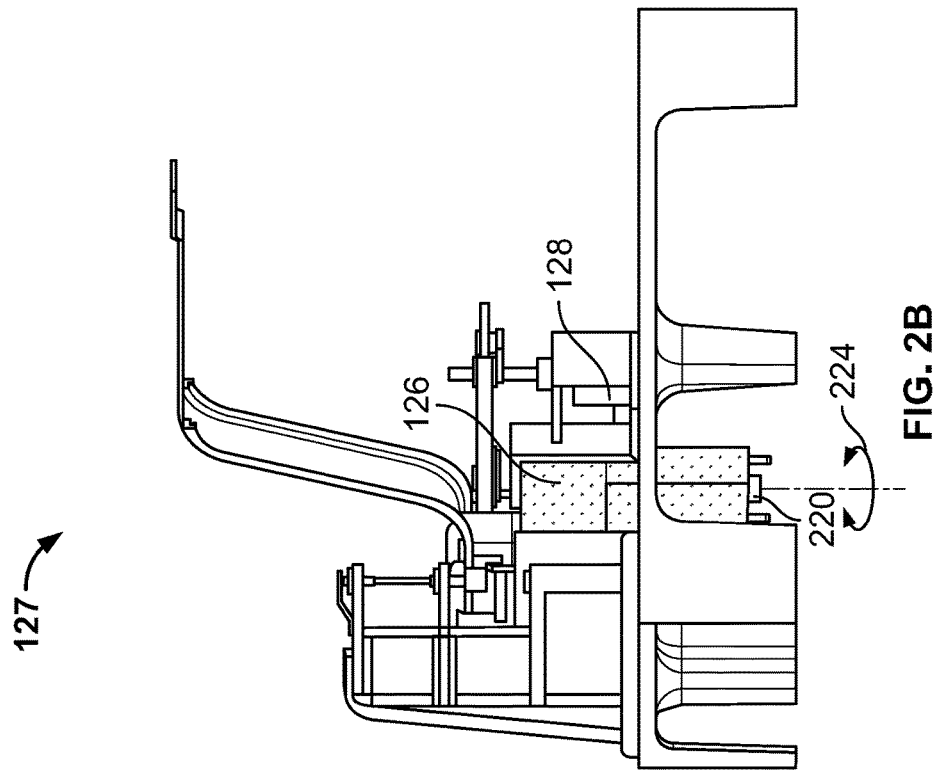
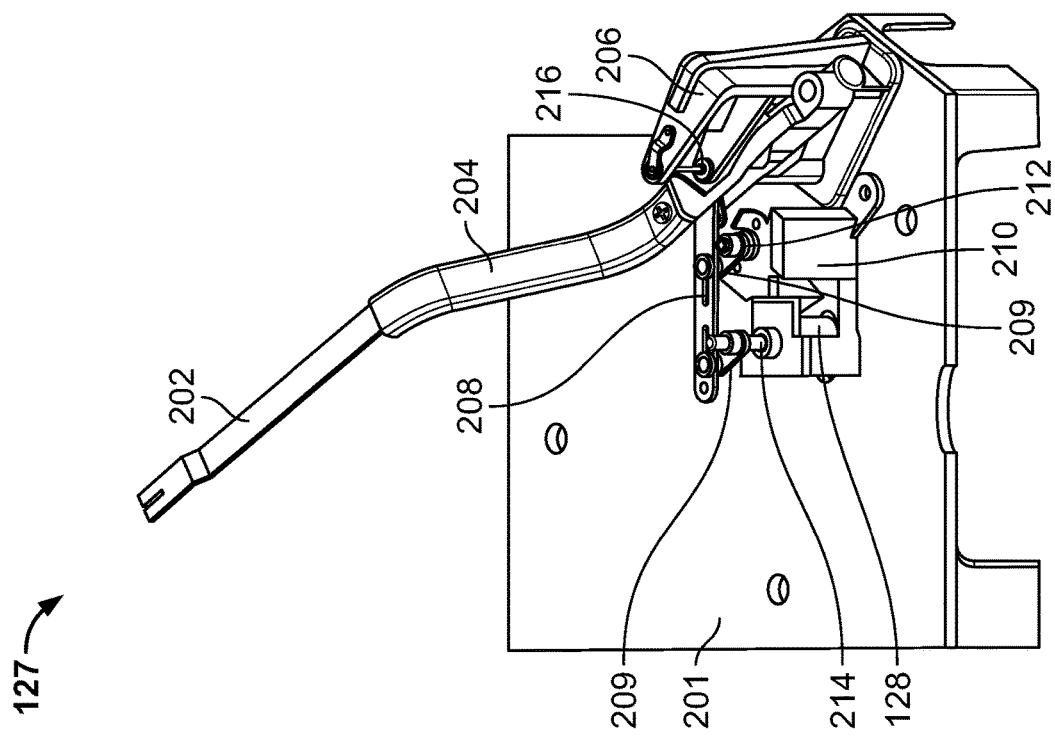
FIG. 2A
FIG. 2B

LOOP-POWERED CONTROL OF PNEUMATIC PROCESS CONTROL DEVICES

FIELD OF THE DISCLOSURE

This disclosure relates generally to process control systems and, more particularly, to loop-powered control of pneumatic process control devices.

BACKGROUND

Many known process control systems employ pneumatic devices, such as a pneumatic controller, to control process control devices (e.g., valves, regulators, flow directors, etc.). Intermediate transducers are often employed in these systems to receive electrical signals (e.g., electrical signals that indicate a set point change) and convert the electrical signals to a pneumatic signal to be forwarded to a pneumatic controller which, in turn, causes movement of a process control device. However, these systems can be subject to reduced accuracy, as well as relatively high cost and complexity.

In some known process control systems, external power sources with relatively high voltages (e.g., above 110 VAC) are employed to power a motor or other electromechanical actuator to make set point adjustments to a pneumatic controller input. However, implementation of these power sources often requires relatively high costs and complexity while preventing a site/location from meeting certifications related to explosions or fire propagation.

SUMMARY

An example apparatus includes an interface for use with a pneumatic process control device of a process control system. The interface includes a power input to scavenge power from a loop power control signal associated with the process control system, a sensor to determine a position of a movable control input associated with the process control device, a comparator to compare the determined position of the movable control input with a desired position of the movable control input, and an actuator to cause movement of the movable control input based on the comparison of the determined position with the desired position, where the actuator is to be powered with the scavenged power.

An example method is implemented for controlling a pneumatic process control device of a process control system. The example method includes scavenging loop power from a control signal associated with the process control system, determining, by a sensor, a position of a movable control input associated with the process control device, comparing, by executing instructions with a processor, the determined position with a desired position of the movable control input, and causing, by executing instructions with the processor, an actuator to move the movable control input based on the comparison of the determined position with the desired position, where the actuator is to be powered with the scavenged power.

An example tangible machine readable medium includes instructions, which when executed, cause a processor to at least cause a power input to scavenge power from a loop power control signal associated with a process control system, determine a position of a movable control input associated with a process control device of the process control system, compare the determined position of the movable control input with a desired position of the movable control input, and cause an actuator to move the movable control input of the process control device based on the comparison of the detected position with the desired position, where the actuator is to be powered with the scavenged power.

An example method includes coupling an interface to a pneumatic controller having a movable control input. The interface includes a power input to scavenge power from a loop power control signal associated with a process control system, a sensor to determine a position of the movable control input associated with a process control device of the process control system, a comparator to compare the determined position of the movable control input with a desired position of the movable control input, and an actuator to cause movement of the movable control input based on the comparison of the determined position with the desired position, where the actuator is powered with the scavenged power. The method also includes coupling a power interface to the interface to provide the loop power to the interface.

BRIEF DESCRIPTION OF THE DRAWINGS

FIGS. 2A and 2B depict an example pneumatic controller interface that can be implemented in examples disclosed herein.

Figure 1:
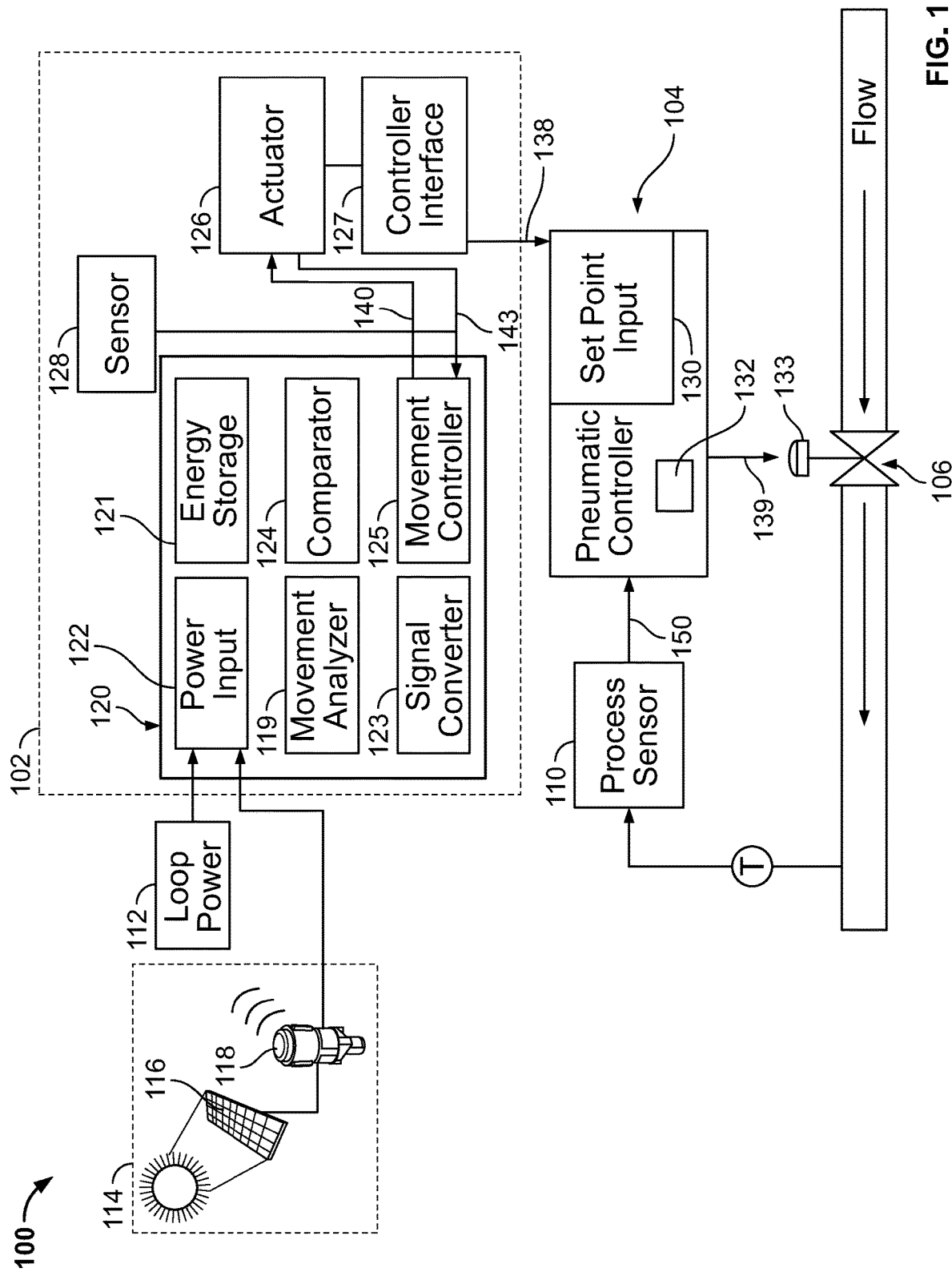
FIG. 1 is a schematic overview of a pneumatic device control system in accordance with teachings of this disclosure.

The figures are not to scale. In general, the same reference numbers will be used throughout the drawing(s) and accompanying written description to refer to the same or like parts. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

Descriptors "first," "second," "third," etc. are used herein when identifying multiple elements or components that may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Loop-powered control of pneumatic devices is disclosed. Some known process-control systems employ intermediate transducers to convert electrical signals (e.g., electrical set point signals) to a pneumatic signal to be sent to a pneumatic controller. However, the accumulation of errors across different signaling devices, as well as signal conversion processes, can significantly reduce accuracy in such systems.

Some known systems employ externally powered devices at a relatively high voltage (e.g., 110 VAC, 24 VDC, etc.) to convert signals and cause movement of a pneumatic controller. However, such known systems exhibit relatively high power consumption and can involve significant cost and complexity. Further, these known systems can increase difficulty in achieving hazardous area certifications due to the relatively high voltage and/or currents needed to power these externally powered devices.

Examples disclosed herein provide accurate, cost-effective and energy-efficient control of pneumatic process control system devices. Examples disclosed herein employ a device interface (e.g., an interface, a pneumatic controller interface) in conjunction with a relatively low power actuator to cause movement of a set point input of a pneumatic controller. Accordingly, examples disclosed herein enable accurate control of corresponding pneumatic process control device(s). Further, examples disclosed herein can prevent the movement of the set point input (e.g., hold the last set point) when power (e.g., loop power, system power, facility power, etc.) is no longer provided.

As used herein, the terms "loop power" and "loop power control signal" refer to a current loop signal (e.g., 4-20 milliamps) associated with process control devices of a process control system (e.g., refineries, factories, industrial applications, etc.). As used herein, the term "scavenge" refers to extracting electrical energy and/or power from a relatively low voltage and/or current signal (e.g., a control signal to control process control devices). As used herein, the term "actuator" refers to any electrically-powered device that affects movement of an object and includes, but is not limited to, a motor, a solenoid, an electromagnetic device, a motor with a gear drive, etc. Accordingly, the term "actuator" can refer to a device that causes linear motion, translational motion, angular motion and/or rotational motion.

FIG. 1 is a schematic overview of an example pneumatic device control system 100 in accordance with teachings of this disclosure. The pneumatic device control system 100 of the illustrated example includes an example pneumatic control interface (e.g., an interface, a device interface) 102, and a pneumatic controller 104 that is operatively coupled to a process control device (e.g., a control valve) 106. The example pneumatic device control system 100 also includes a process sensor 110, and a loop power control signal 112. In some other examples, the pneumatic device control system 100 includes a power/signal harvester 114, which includes a solar panel (e.g., a radiant light energy harvester, a solar array, etc.) 116 and a signal transceiver (e.g., a wireless signal transceiver, a wireless module) 118, which is communicatively coupled to a network and/or remote process control system (e.g., a remote process control system).

According to the illustrated example, the pneumatic control interface 102 includes a control circuit 120, which includes a movement analyzer 119, an energy storage 121, a power input 122, a signal converter 123, a comparator 124 and a movement controller 125. Further, the example pneumatic control interface 102 also includes an actuator 126, which is implemented as an electrically-powered motor in this example, a controller interface (e.g., a mechanical controller interface) 127 and a sensor (e.g., a positional sensor) 128.

The example pneumatic controller 104 includes a movable set point input (e.g., a movable input, a movable control input, an input lever, an input switch, etc.) 130 and a pneumatic amplifier 132. In particular, the movable set point input 130 is moved (e.g., rotated clockwise and/or counter-clockwise) to control the output of the pneumatic amplifier 132, which provides a pneumatic output signal 139 to a pneumatic actuator 133 associated with the process control device 106.

According to the illustrated example, the power input 122 scavenges power from the relatively low power loop power control signal 112. In particular, the power input 122 scavenges power from the loop power control signal 112 and provides the scavenged power to the actuator 126. Accordingly, using the scavenged power, the actuator 126 is operated to move the movable set point input 130 of the pneumatic controller 104. In this example, the loop power control signal 112 is less than 50 milliamps (mA) of current (e.g., 4-20 mA, 10-50 mA, etc.). In some examples, some or all of the scavenged power is stored in the aforementioned energy storage 121, which may be implemented as a battery or other energy storage device (e.g., one or more capacitors).

To determine a position of the actuator 126 and/or the movable setpoint 130, the movement analyzer 119 of the illustrated example receives sensor data from the sensor 128 and determines a position of the actuator 126, a movable portion, such as an interfacing portion 220 of the actuator 126 shown in FIG. 2B, and/or the movable set point input 130. In some examples, the movement analyzer 119 determines an angular displacement and/or rotational angle associated with the actuator 126 and/or the movable set point input 130.

According to the illustrated example, the comparator 124 compares the determined position of the actuator 126 and/or the movable set point input 130 from the movement analyzer 119 with a desired position. In this example, the desired position is based on a set point encoded within the loop power control signal 112 (e.g., the set point is converted/decoded by the signal converter 123). Additionally or alternatively, the desired position is at least partially based on a signal from the process sensor 110. As a result, the comparison between the determined and desired positions is used to direct movement and/or adjustment of the actuator 126 to vary the movable set point input 130.

To direct movement of the actuator 126 and, in turn, the movable set point input 130, as generally shown by an arrow 138, the control circuit 120 and/or the movement controller 125 transmits a control signal to the actuator 126, as generally indicated by an arrow 140. Accordingly, the actuator 126 actuates the controller interface 127 and the movable set point input 130 which, in turn, controls the pneumatic controller 104 along with the process control device 106. As a result, movement of the actuator 126 and, thus, the movable set point input 130 is accomplished without external power having a relatively high voltage (i.e., a power source other than that of the loop control signal 112) or pneumatic devices in this example. In other examples, the actuator 126 can cause translational, rather than rotational, movement of the movable set point 130.

To control a position and/or degree of movement of the actuator 126, a positional measurement associated with the actuator 126 is provided to the movement controller 125 from the sensor 128, as generally indicated by an arrow 143. According to the illustrated example, based on the loop power control signal 112 (e.g., signals encoded in the loop power control signal 112), the signal converter 123 converts and/or determines a desired position of the actuator 126 and/or the movable set point input 130 (e.g., a 4 mA signal represents a fully closed position of the process control device 106 while a 20 mA signal represents a fully open position of the process control device 106). Further, the comparator 124 determines a degree to which a current position of the actuator 126, a movable portion of the actuator 126 and/or the movable set point input 130 is different from the desired position. In other words, the comparator 124 determines a deviation between the current position and the desired position. In this example, measurements from the position sensor 128 are used to determine the current position. However, in other examples, measurements from the actuator 126 are used to determine the current position (e.g., without the sensor 128). Based on the comparison performed by the comparator 124, the control circuit 120 directs movement of the actuator 126 to bring the actuator 126 (e.g., a movable portion of the actuator 126) and/or the movable set point input 130 within a tolerance range (e.g., a tolerance error range of less than 5%) of its respective desired position. In some examples, the movement of the actuator 126 and/or the tolerance range is user configurable.

According to the illustrated example, when the power input 122 ceases to receive loop power from the loop power control signal 112, the actuator 126 ceases movement and/or is held in its last position. In other words, the actuator 126 is able to maintain a current set point (e.g. a lock-in-last value, a fail-in-fast value, a maintain-last value, etc.) during a no-power condition, such as a power outage or loop power failure. In some other examples, the loop power control signal 112 and/or energy stored in the energy storage 121 is used to maintain the current set point when other power sources (e.g., higher voltage/current sources, a source of the loop power control signal 112) have ceased providing power (e.g., a process control system power outage).

In this example, the movement controller 125 directs movement of the actuator 126 based on the desired position from the movement analyzer 119 and/or the comparator 124. In some other examples, however, the movement controller 125 directs the movement of the actuator 126 further based on signals from the process sensor 110.

In some examples, the example power input 122 directs storage of energy from the loop power control signal 112 into the energy storage 121. In some such examples, the stored energy can be used to maintain the actuator 126 in a stationary position (e.g., a locked position, a locked rotation, etc.), as opposed to the actuator 126 mechanically locking, for example, when the loop power control signal 112 is no longer provided. In some examples, the movement controller 125 enables a manual override setting that allows a user or operator to manually move the movable set point input 130 while preventing the actuator 126 from locking.

In some examples, the desired position associated with the actuator 126 is determined at least partially based on sensor data from the process sensor 110. In some such examples, the process sensor 110 provides measurement data to the pneumatic controller 104, as generally indicated by an arrow 150, so that the pneumatic controller 104 can verify that the process control device 106 is operating within expected or desired parameters.

In some examples, the actuator 126 is implemented as a stepper motor, a low-voltage DC motor, etc. In some such examples, the actuator 126 has an associated gear drive. In some examples, the sensor 128 is implemented as potentiometer. Additionally or alternatively, the sensor 128 is implemented as a magnetic field sensor, a hall effect sensor and/or an imaging sensor. However, any appropriate positional and/or rotation measuring device can be implemented instead.

In some other examples, the power scavenged by the power input 122 is generated from harvesting radiant light energy (e.g., solar energy) via the solar panel 116. In such examples, the signal transceiver 118 receives wireless signals (e.g. Wi-Fi signals, Highway Addressable Remote Transducer (HART) protocol, Bluetooth, etc.) associated with a process control system (e.g., a process control input signal), encodes the wireless signal as a loop power control signal and forwards the loop power control signal to the power input 122. In other words, the example signal transceiver 118 can combine relatively low voltage power harvested from the solar panel 116 with the received wireless signals to define the loop power control signal to be forwarded to the power input 122.

FIGS. 2A and 2B depict the example pneumatic controller interface 127 that can be implemented in examples disclosed herein. In this example, the pneumatic controller interface 127 is implemented to convey movement (e.g., translation and/or rotational movement, mechanical movement, etc.) from the pneumatic control interface 102 to the pneumatic controller 104, both of which are described above in connection with FIG. 1.

Turning to FIG. 2A, the pneumatic controller interface 127 includes a mounting plate 201, a set point indicator (e.g., a visual set point indicator) 202, a set point indicator arm 204, a first mounting bracket 206, a movement arm (e.g., a movement translator, a movement linkage, a four-bar linkage, a joining linkage, a rotatable coupling arm, etc.) 208, movement linkages 209 and a second mounting bracket 210. In this example, the second mounting bracket 210 defines first and second pivots 212, 214 while the first mounting bracket 206 defines a third pivot 216.

As can be seen in FIG. 2A, the first mounting bracket 206 mounts and aligns the set point indicator 202. Further, the second mounting bracket 210 supports and aligns the sensor 128, which is implemented as a potentiometer in this example, as well as the actuator 126 (shown in FIG. 2B).

FIG. 2B is a side view of the example pneumatic controller interface 127 described above in connection with FIG. 2B. In this example, the actuator 126 is shown with the aforementioned interfacing portion (e.g., a moving portion, a rotatable interfacing portion, etc.) 220 that is to contact and engage the movable set point input 130 shown in FIG. 1 (e.g., rotate at least a portion of the movable set point input 130). In this example, motion of the movable set point input 130 is measured (e.g., measured directly or indirectly) by the sensor 128. In some examples, the interfacing portion 220 is coupled to the movable set point input 130 via a fastener (e.g., a mechanical fastener).

In operation, the control circuit 120 of FIG. 1 directs and controls movement of the actuator 126 and, in turn, the pneumatic controller interface 127 translates motion from the actuator 126 to the movable input set point 130. In particular, the first pivot 212 is defined by the actuator 126, the second pivot 214 is defined by the sensor 128, and the third pivot 216 is defined by the set point indicator 202. In other words, the movement arm 208 and the movement linkages 209 relate motion between the first, second and third pivots 212, 214, 216 of FIG. 2A, thereby coupling motion between the set point indicator 202, the actuator 126 and the sensor 128. In particular, a rotational movement of the actuator 126 at the first pivot 212 causes a rotational movement of the movement arm 208 and the interfacing portion 220, as generally indicated by a double arrow 224.

As the movement arm 208 translates the second pivot 214, rotates to vary a signal detected by the sensor 128 and, in turn, the set point indicator 202 rotates about the third pivot 216 to indicate a setting corresponding to the process control device 106.

In some examples, the movement linkages 209 and/or the movement arm 208 can be adjusted to vary a relative degree of rotation between the first, second and third pivots 212, 214, 216. In particular, lengths of any of the movement arm 208 and/or the movement linkages 209 spanning between any one of the first, second and third pivots 212, 214, 216 can be adjusted. In other words, in such examples, the movement links 209 and/or the movement arm 208 include at least one length adjustable portion to vary relative rotational motion between the first, second and third pivots 212, 214, 216.

While an example manner of implementing the pneumatic device control system 100 of FIG. 1 is illustrated in FIG. 1, one or more of the elements, processes and/or devices illustrated in FIG. 1 may be combined, divided, re-arranged, omitted, eliminated and/or implemented in any other way. Further, the example movement analyzer 119, the example power input 122, the example signal converter 123, the example comparator 124, the example movement controller 125 and/or, more generally, the example pneumatic device control system 100 of FIG. 1 may be implemented by hardware, software, firmware and/or any combination of hardware, software and/or firmware. Thus, for example, any of the example movement analyzer 119, the example power input 122, the example signal converter 123, the example comparator 124, the example movement controller 125 and/or, more generally, the example pneumatic device control system 100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example movement analyzer 119, the example power input 122, the example signal converter 123, the example comparator 124, and/or the example movement controller 125 is/are hereby expressly defined to include a non-transitory computer readable storage device or storage disk such as a memory, a digital versatile disk (DVD), a compact disk (CD), a Blu-ray disk, etc. including the software and/or firmware. Further still, the example pneumatic device control system 100 of FIG. 1 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
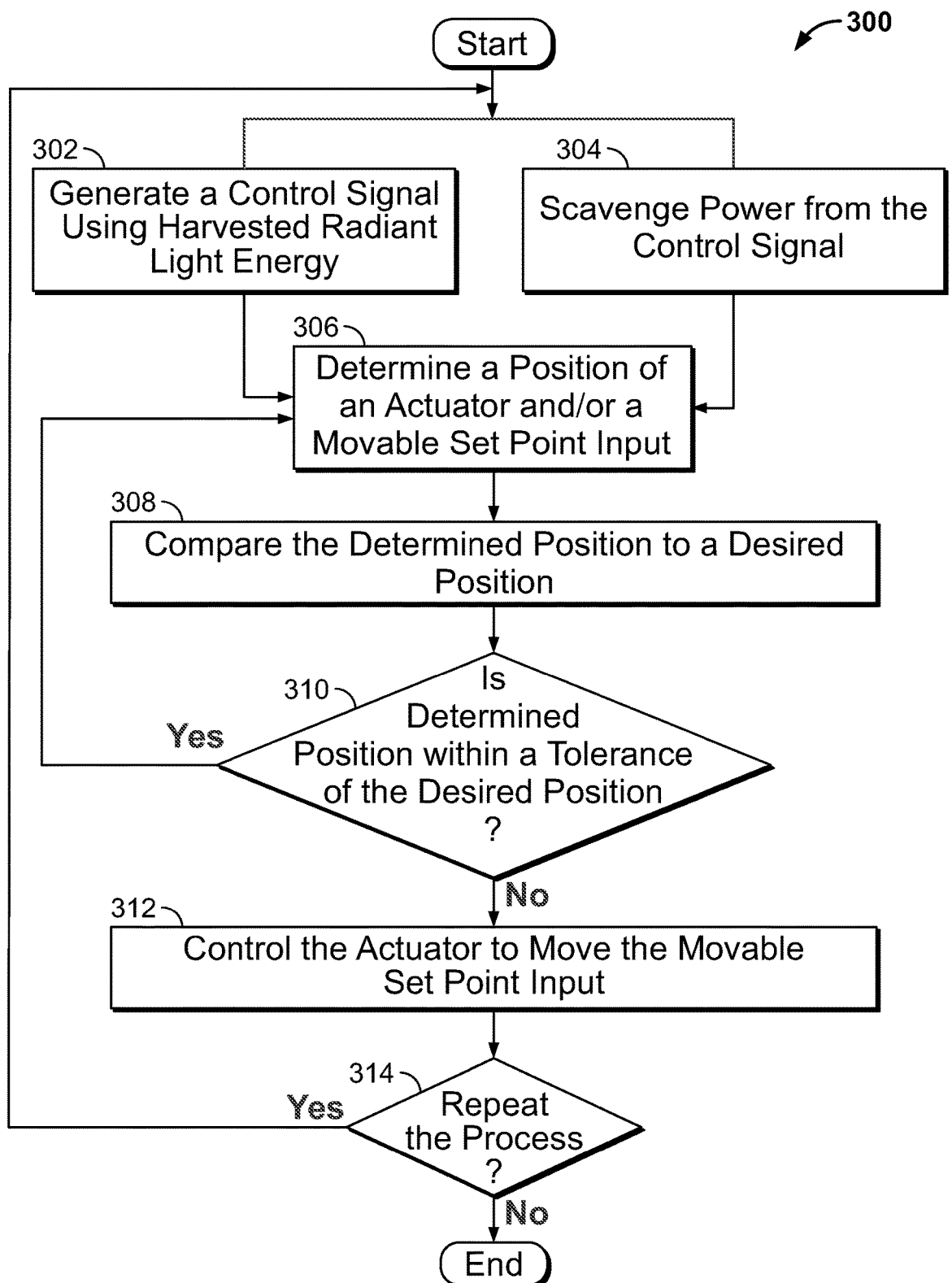
FIG. 3 is a flowchart representative of machine readable instructions which may be executed to implement examples disclosed herein.

A flowchart representative of example hardware logic, machine readable instructions, hardware implemented state machines, and/or any combination thereof for implementing the pneumatic device control system 100 of FIG. 1 is shown in FIG. 3. The machine readable instructions may be one or more executable programs or portion(s) of an executable program for execution by a computer processor such as the processor 412 shown in the example processor platform 400 discussed below in connection with FIG. 4. The program may be embodied in software stored on a non-transitory computer readable storage medium such as a CD-ROM, a floppy disk, a hard drive, a DVD, a Blu-ray disk, or a memory associated with the processor 412, but the entire program and/or parts thereof could alternatively be executed by a device other than the processor 412 and/or embodied in firmware or dedicated hardware. Further, although the example program is described with reference to the flowchart illustrated in FIG. 3, many other methods of implementing the example pneumatic device control system 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIG. 3 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

The example method 300 begins as the actuator 126 is to be controlled to move the movable set point input 130 and, in turn, control pneumatic operation of the process control device 106. According to the illustrated example, the pneumatic control interface 102 and/or the actuator 126 is to be powered via a low current signal (e.g., below 20 mA). In some examples, the actuator 126 is supplied with a relatively high pulse and low duration signal.

At block 302, in some examples where the loop power control signal 112 is not provided, the power/signal harvester 114 generates and/or encodes a control signal (e.g., a low voltage/current control signal) using harvested radiant light energy (e.g., solar power) via the solar panels 116.

According to the illustrated example, at block 304, the power input 122 scavenges power from the loop power control signal 112 or the energy harvester 114. In some examples, the power input 122 directs the power storage 121 to store at least a portion of the scavenged power (e.g., stored within a battery, a capacitor, etc.).

At block 306, the example movement analyzer 119 determines a position associated with movement of the actuator 126, the interfacing portion 220 of the actuator 126 and/or the movable input set point 130 based on data from the sensor 128. Additionally or alternatively, data from the sensor 110 proximate the process control device 106 is used to determine the position.

In this example, at block 308, the example comparator 124 compares the aforementioned determined position with a desired position associated with the actuator 126. In some examples, the comparator 124 calculates an error between the determined and desired positions. In some examples, a deviation value from a tolerance range defined by the desired position is calculated by the comparator 124.

At block 310, the example comparator 124 determines whether the determined position is within a tolerance of the desired position. In particular, a determination of a degree to which the determined position lies relative to a tolerance (e.g., a tolerance band) is determined and if the determined position is within the tolerance (block 310), control of the process returns to block 306. Otherwise, the process proceeds to block 312.

At block 312, the movement controller 125 causes the actuator 126 to move the movable set point input 130 based on the comparison between the desired and determined positions.

It is then determined whether to repeat the process (block 314). If the process is to be repeated (block 314), control of the process returns to block 302. Otherwise, the process ends. This determination may be based on whether further control of the process control device 106 is desired.

Figure 4:
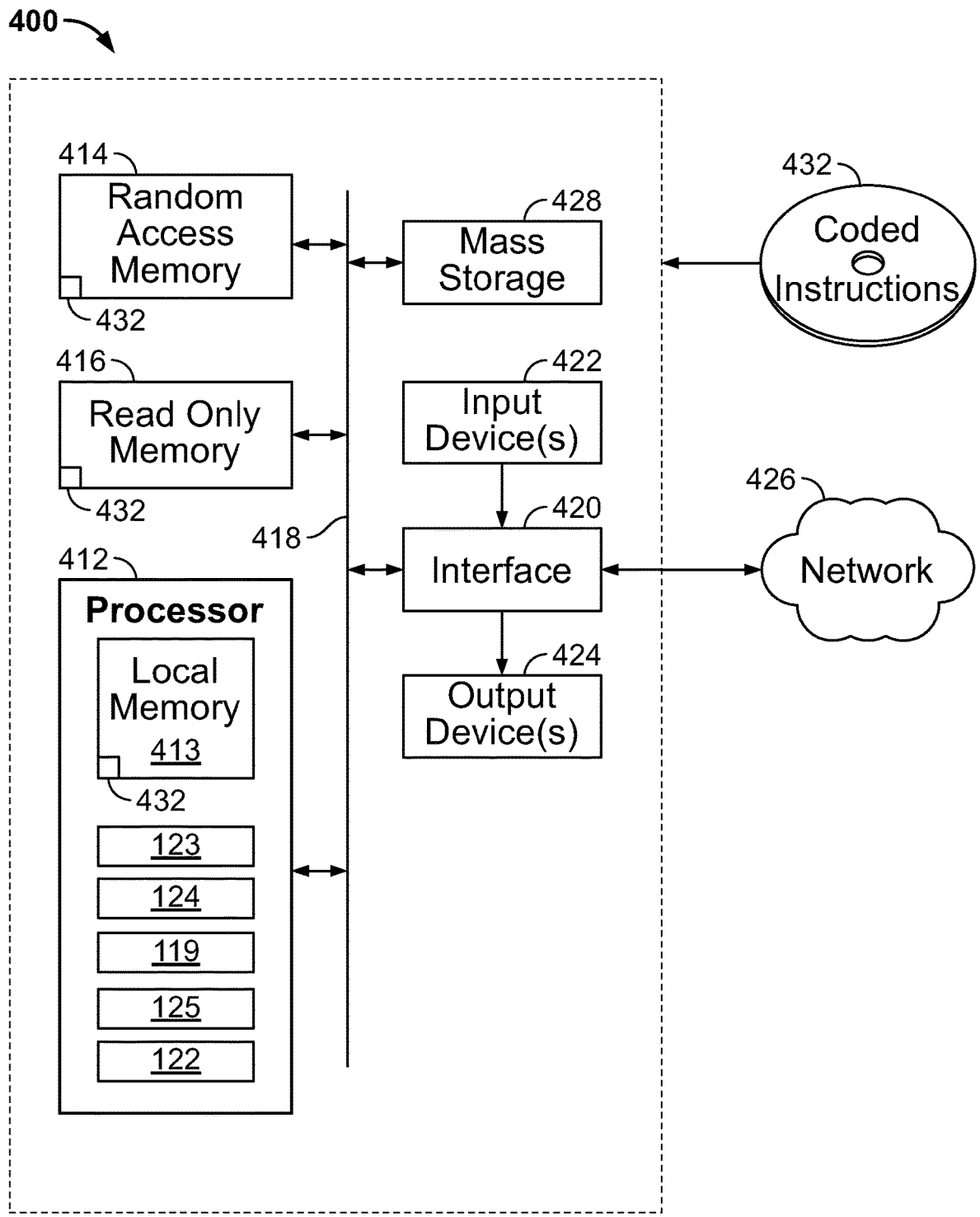
FIG. 4 is a block diagram of an example processing platform structured to execute the instructions of FIG. 3 to implement the example pneumatic device control system of FIG. 1.

FIG. 4 is a block diagram of an example processor platform 400 structured to execute the instructions of FIG. 3 to implement the pneumatic device control system 100 of FIG. 1. The processor platform 400 can be, for example, a server, a personal computer, a workstation, a self-learning machine (e.g., a neural network), a mobile device (e.g., a cell phone, a smart phone, a tablet such as an iPad'), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 400 of the illustrated example includes a processor 412. The processor 412 of the illustrated example is hardware. For example, the processor 412 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example movement analyzer 119, the example comparator 124, the example power/input 122, the example movement controller 125 and the example signal converter 123.

The processor 412 of the illustrated example includes a local memory 413 (e.g., a cache). The processor 412 of the illustrated example is in communication with a main memory including a volatile memory 414 and a non-volatile memory 416 via a bus 418. The volatile memory 414 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 416 may be implemented by flash memory and/or any other desired type of memory device. Access to the main memory 414, 416 is controlled by a memory controller.

The processor platform 400 of the illustrated example also includes an interface circuit 420. The interface circuit 420 may be implemented by any type of interface standard, such as an Ethernet interface, a universal serial bus (USB), a Bluetooth® interface, a near field communication (NFC) interface, and/or a PCI express interface.

In the illustrated example, one or more input devices 422 are connected to the interface circuit 420. The input device(s) 422 permit(s) a user to enter data and/or commands into the processor 412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 424 are also connected to the interface circuit 420 of the illustrated example. The output devices 424 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 420 of the illustrated example, thus, typically includes a graphics driver card, a graphics driver chip and/or a graphics driver processor.

The interface circuit 420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 426. The communication can be via, for example, an Ethernet connection, a digital subscriber line (DSL) connection, a telephone line connection, a coaxial cable system, a satellite system, a line-of-site wireless system, a cellular telephone system, etc.

The processor platform 400 of the illustrated example also includes one or more mass storage devices 428 for storing software and/or data. Examples of such mass storage devices 428 include floppy disk drives, hard drive disks, compact disk drives, Blu-ray disk drives, redundant array of independent disks (RAID) systems, and digital versatile disk (DVD) drives.

The machine executable instructions 432 of FIG. 3 may be stored in the mass storage device 428, in the volatile memory 414, in the non-volatile memory 416, and/or on a removable non-transitory computer readable storage medium such as a CD or DVD.

Figure 5:
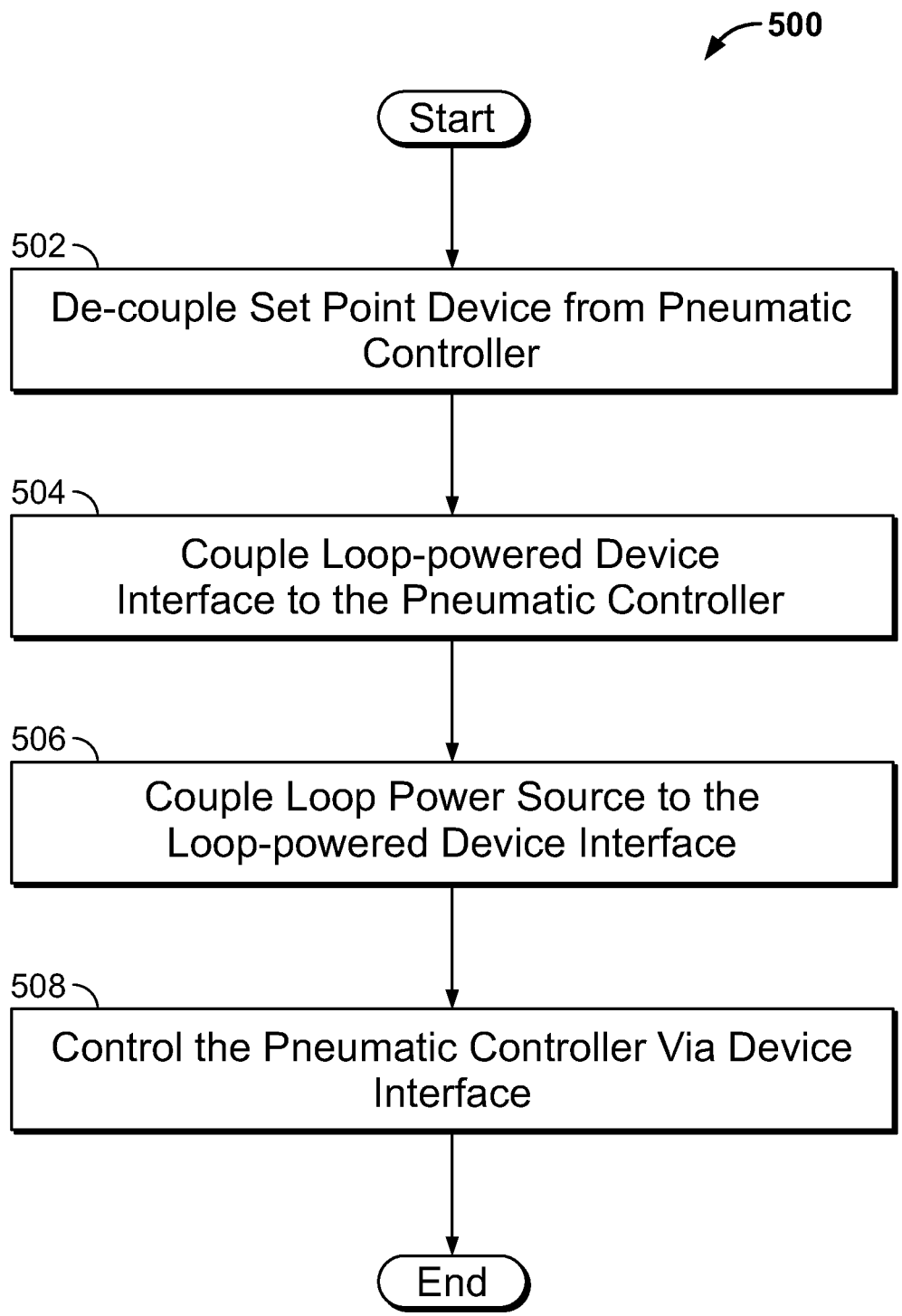
FIG. 5 is a flowchart representative of an example method to install or retrofit an example device interface of the example pneumatic device control system of FIG. 1.

FIG. 5 is a flowchart representative of an example method 500 to install or retrofit the example pneumatic control interface 102 of the example pneumatic device control system 100 of FIG. 1 onto a pneumatic controller, such as the pneumatic controller 104. In particular, the example pneumatic control interface 102 can be retrofit onto an existing pneumatic controller so that pneumatic-based-movement controls and/or relatively high voltage lines can be removed from a process control site for hazard compliance during an upgrade process, for example.

At block 502, in this example, a set point device (e.g., a pneumatic-operation-based set point device, a set point device that utilizes an external power source of greater than 110 VAC, etc.) is de-coupled (e.g., removed, unconnected) from a pneumatic controller (e.g., the pneumatic controller 104).

At block 504, a loop-powered device interface, such as the example pneumatic control interface 102, is coupled to the pneumatic controller.

At block 506, a loop power source is coupled to the loop-powered device interface. In particular, a power interface (e.g., a power interface connector) associated with the loop power is coupled to the device interface to provide the loop power to the device interface and, in turn, an actuator associated with the device interface.

At block 508, the pneumatic controller is controlled by the device interface, which is powered by scavenged power from the loop power source and the process ends.

From the foregoing, it will be appreciated that example methods, apparatus and articles of manufacture have been disclosed that enable energy-efficient, cost-effective and accurate control of pneumatic devices of process control systems via a loop-powered device interface. Examples disclosed herein enable an actuator of the loop-powered device to resist or cease movement (e.g. a fail-safe position, a locked position, etc.) based on a condition in which power (e.g., loop power) is no longer provided. Further, examples disclosed herein do not necessitate relatively high voltage sources, thereby allowing hazard specifications to be more easily met.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An interface for use with a pneumatic process control device of a process control system, the interface comprising:
   a power input to scavenge power from a loop power control signal associated with the process control system;
   a sensor to determine a position of a movable control input associated with the process control device;
   a comparator to compare the determined position of the movable control input with a desired position of the movable control input;
   an energy storage to store energy from the loop power control signal; and
   an actuator to cause movement of the movable control input based on the comparison of the determined position with the desired position, the actuator powered with the scavenged power, wherein the actuator is to prevent movement of the movable control input when the loop power control signal is not provided to the power input, the movement of the actuator to be prevented via the stored energy.

2. The interface as defined in claim 1, further including a radiant light energy harvester to generate the loop power control signal.

3. The interface as defined in claim 1, wherein the loop power control signal includes a 4-20 milliamps (mA) signal.

4. The interface as defined in claim 1, further including a linkage to couple a first rotational motion of the actuator with a second rotational motion of a sensor.

5. The interface as defined in claim 4, wherein the linkage includes an adjustable length portion to vary a relationship between the first and second rotational motions.

6. The interface as defined in claim 1, further including an energy storage to store electrical energy scavenged from the loop power control signal.

7. The interface as defined in claim 1, wherein the loop power control signal defines a set point of the process control device.

8. The interface as defined in claim 1, wherein the stored energy is to maintain the movable control input in a locked position.

9. The interface as defined in claim 1, wherein the stored energy is to move the movable control input into a locked position.

10. The interface as defined in claim 1, wherein the movable control input can be adjusted via a manual override when the loop power control signal is not provided to the power input.

11. A method for controlling a pneumatic process control device of a process control system, the method comprising:
   scavenging loop power from a loop power control signal associated with the process control system;
   determining, by a sensor, a position of a movable control input associated with the process control device of the process control system;
   comparing, by executing instructions with a processor, the determined position with a desired position of the movable control input;
   causing an actuator to move the movable control input based on the comparison of the determined position with the desired position, the actuator powered with the scavenged power; and
   preventing, via the actuator, movement of the movable control input when the loop power control signal is not provided, wherein movement of the movable control input is prevented via energy stored in an energy storage, the energy stored from the loop power control signal.

12. The method as defined in claim 11, further including generating, by executing instructions with the processor, the loop power control signal via harvested radiant light energy.

13. The method as defined in claim 11, wherein the determining the position of the movable control input includes determining a position of a movable portion of the actuator.

14. The method as defined in claim 11, wherein the loop power includes a 4-20 milliamps (mA) signal.

15. The method as defined in claim 11, wherein causing the actuator to move the movable controllable input includes controlling a motor operatively coupled to the movable control input.

16. The method as defined in claim 11, wherein the loop power control signal defines a set point of the process control device.

17. A non-transitory machine readable medium comprising instructions, which when executed, cause a processor to at least:
   cause a power input to scavenge power from a loop power control signal associated with a process control system;
   determine a position of a movable control input associated with a process control device of the process control system;
   compare the determined position of the movable control input with a desired position of the movable control input;
   cause an actuator to move a movable control input of the process control device based on the comparison of the determined position with the desired position, the actuator powered with the scavenged power; and
   cause the actuator to prevent movement of the movable control input when the loop power control signal is not provided to the power input, the movement of the movable control input to be prevented via stored energy from an energy storage, the energy stored from the loop power control signal.

18. The non-transitory machine readable medium as defined in claim 17, wherein the loop power control signal is generated via harvested radiant light energy.

19. The non-transitory machine readable medium as defined in claim 17, wherein the loop power control signal includes a current less than 50 milliamps (mA).

20. The non-transitory machine readable medium as defined in claim 17, wherein the loop power control signal defines a set point of the process control device.

21. A method comprising:
   coupling an interface to a pneumatic controller having a movable control input, the interface including:
      a power input to scavenge power from a loop power control signal associated with a process control system,
      a sensor to determine a position of the movable control input associated with a process control device of the process control system,
      a comparator to compare the determined position of the movable control input with a desired position of the movable control input, and
      an actuator to cause movement of the movable control input based on the comparison of the determined position with the desired position, the actuator powered with the scavenged power, the actuator to prevent movement of the movable control input when the loop power control signal is not provided to the interface, the movement of the movable control input to be prevented via stored energy from an energy storage, the energy stored from the loop power control signal; and
   coupling a power interface to the interface to provide the loop power control signal to the interface.

22. The method as defined in claim 21, further including removing a set point device from the pneumatic controller prior to coupling the interface.

* * * * *